Patented Oct. 20, 1953

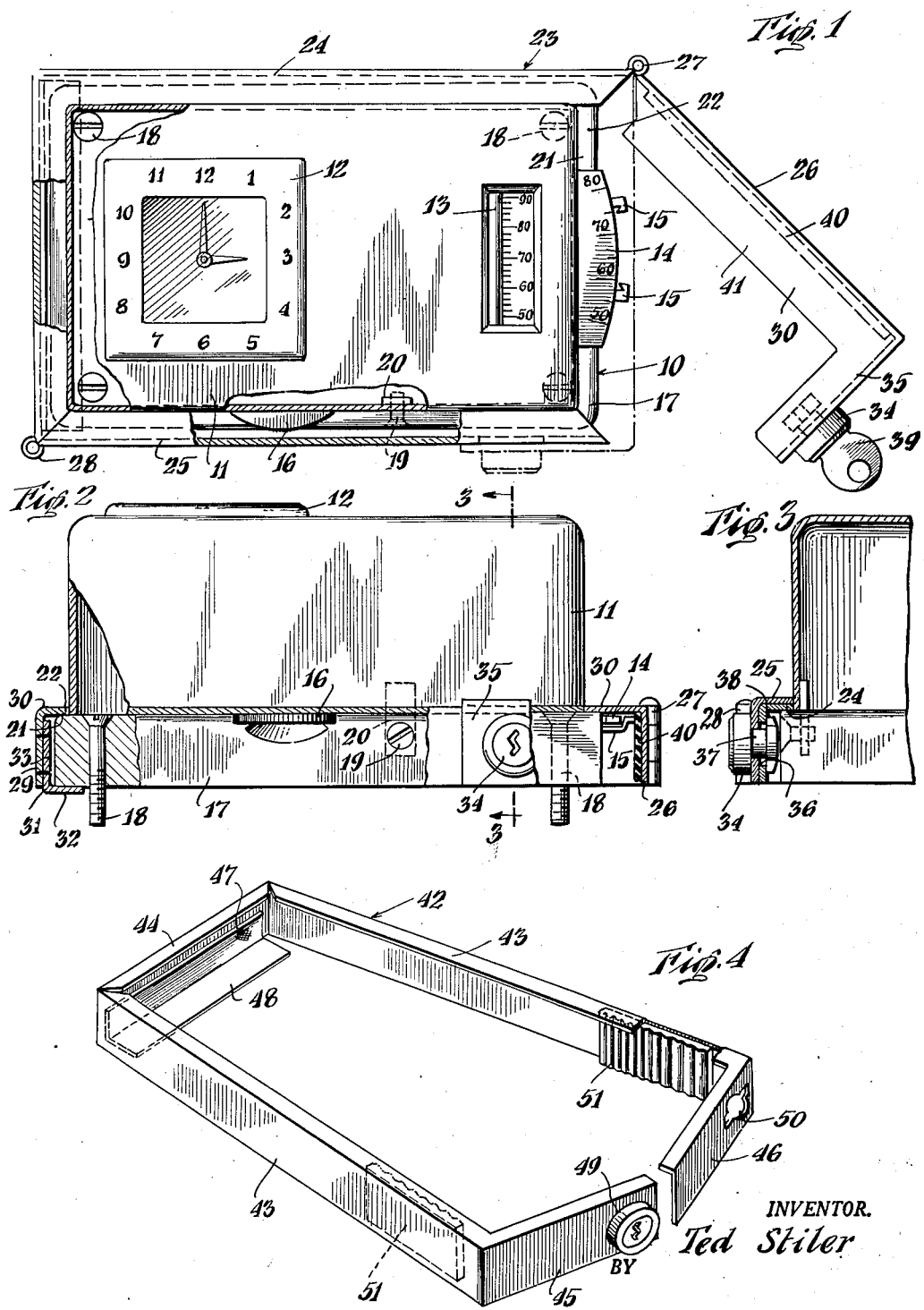

2,655,806

UNITED STATES PATENT OFFICE 2,655,806

LOCK FOR THERMOSTATS

Ted Stiler, Brooklyn, N. Y.

Application January 24, 1950, Serial No. 140,323

2 Claims. (Cl. 70—57)

This invention relates to protective coverings on control devices, and more particularly to protective coverings on control devices which have manually operative controls extending from the body of the control device.

It is an object of this invention to provide a frame which can be locked around a thermostatic control device without modification or alteration of the thermostatic control device.

It is another object of this invention to provide a protective frame which may be placed on a thermostatic control device with a minimum of change in the external appearance of the thermostatic control device.

It is a still further object of this invention to provide a protective frame covering the controls in a thermostatic control device in which the controls will be easily accessible when the protective frame is in place on the thermostatic control device, and yet the frame may be readily locked in a protecting position.

It is still another object of this invention to provide a protective device for thermostatic controls which is simple to manufacture and of rugged construction. These and other objects of this invention will become more apparent upon consideration of the following description, taken together with the accompanying drawings in which:

Fig. 1 is a front elevation of a thermostatic control incorporating this invention with the structure partly broken away and shown in section;

Fig. 2 is a bottom view of the thermostatic control of Fig. 1 partly broken away and shown in section;

Fig. 3 is a transverse section of the bottom portion of the thermostatic control of Figs. 1 and 2 taken on line 3—3 of Fig. 2 in the direction of the arrows, and Fig. 4 is a perspective view of a modified protective frame of this invention.

Control devices such as thermostatic control devices often have manual controls extending outside of the casing so as to be available for adjustment without disassembling the device. In some installations of such a device it is desirable that the access to these manual controls be limited to designated personnel. In Fig. 1 such a thermostatic control device 10 is shown. The thermostatic device 10 has a casing 11 on the front of which is mounted a clock 12 and a thermometer 13 in appropriate apertures. From the right side of the casing 11 as shown in Fig. 1, a dial 14 protrudes far enough so that a range of degrees of temperature printed thereon is readily visible. Also protruding from the casing 11 adjacent the dial 14 are levers 15. The levers 15 provide one of the controls in the operation of the thermostatic control device 10. Protruding from the bottom of the casing 11, a wheel 16 provides a means for setting the clock 12 which is incorporated in the thermostatic control device 10.

As shown in Fig. 2, the casing 11 and its contents are mounted on a mount 17 which in turn is secured to any suitable surface such as a wall by screws 18. The casing 11 in turn is fastened to the mount 17 by casing screws 19 inserted into the side of mount 17 and screwed into lugs 20 which extend into the mount 17 from the rear edge of the casing 11. The casing 11 thus mounted on the mount 17 is slightly smaller in rectangular dimensions than the mount 17, and consequently a ledge 21 is provided around the mount 17 on its upper or front surface 22. This ledge 21 is indented on the right side and at the bottom where the dial 14 and wheel 16 protrude from the casing 11 so that the dial 14 and wheel 16 are set in the ledge 21.

Referring again to Fig. 1 it is seen that a frame 23 is provided which extends around the periphery of the thermostatic device 10. The frame 23 is made up of a flanged angular member 24, a flanged straight member 25, and a flanged angular member 26. One leg of the angle member 24 extends across the top of the device 10 and the other leg down the left side as seen in Fig. 1. The member 25 extends across the bottom of the device 10 while the angle member 26 extends down the right side of device 10 as seen in Fig. 1 with a short leg overlapping member 25 at the bottom of the device 10. A hinge 27 attaches a main leg 41 of the angle member 26 to the angle member 24 at the upper right-hand corner of the control device 10 as shown in Fig. 1. A hinge 28 attaches the member 25 to the angle member 24 at the lower left-hand corner of the control device as shown in Fig. 1. The frame 23 thus envelops the control device 10. The angle members 24 and 26 and the straight member 25 are made up of main sections 29 and flanges 30 as seen in the sections in Figs. 2 and 3. The main sections 29 are parallel to the sides of the mount 17 and the casing 11 while the flanges 30 forming a right angle with the main sections 29 are turned inward toward the casing 11 and over surface 22 of the mount 17. The main sections 29 have a height which is slightly greater than the height of the mount 17 so that when the frame 23 is placed flush against the wall supporting the control device 10, the flanges 30 will overlie the surface 22 leaving as little clearance as possible. As shown in Fig. 2, the short leg of the piece 24 at the left side of the control device 10 has attached to it an additional angle piece 31. This angle piece is fastened to the inner surface of the member 24 and has an inferior flange 32 at right angles to its main section 33 and the main section 29 of the member 24. This inferior flange extends laterally in the same direction as the flange 30 on the short leg of the member 24. This inferior flange 32 underlies the mount 17 when the flange 32 is placed around the control device 10 so that upon placing the control device 10 upon a suitable surface, the flange 32 will be between the mount 17 and the surface. In this way, the frame 23 is held in place on the control device 10.

As the flanges 30 on the angle members 24 and 26 and the straight member 25 overlie the surface 22, the flanges 30 on member 25 and member 26 overlie the wheel 16 and the dial 14, respectively. When the frame 23 is in its closed position, these controls are inaccessible. As shown in Fig. 1, the flanged angle member 26 is shown in full lines hinged outwardly from the device 10 to bare the dial 14 and the levers 15. In the same figure the piece 26 is shown in dotted lines in closed position against the casing 11. The member 25 is shown in Fig. 1 in closed position against the casing 11 but is also capable of swinging to an open position to uncover the wheel 16. The angle member 26 carries a lock 34 on its short underlying leg 35. The member 25 has an aperture 36 which in the closed position registers with the lock 34 and receives a cylinder 37 of the lock 34. A cam 38 at the end of cylinder 37 extends within the frame 23 upon actuation by a key 39. In this way, the straight member 25 and the angle member 26 may be locked together and the frame 23 as a whole is locked on the control device 10. In this closed position a friction pad 40 lining the inner surface of the main leg 41 of the member 26 contacts the ends of the levers 15 as seen in Fig. 2. With the frame 23 thus locked in position, the levers 15 are rendered immobile until the member 26 is released by unlocking lock 34 and hinging the member 26 outwardly.

The protective frame 23 is applied in practice by placing it on the device 10 when the device is put in place on the wall or supporting surface. The frame 23, in open position, is placed around the device 10 with the casing 11 removed. The mount 17 is then fastened to a wall or other suitable supporting surface by the screws 18. The casing is then secured in place by the screws 19 and the appropriate controls set. The members 25 and 26 are then swung into closed position and the lock 34 locked and the key 39 removed. In this condition the thermostatic control device 10 is free to function according to its designated purpose operating under its set controls. These controls, and particularly the external manually operated controls, are not subject to alteration but remain unchanged until the frame 23 is opened by unlocking lock 34.

Thus a simple device is provided which will protect such a control device from tampering, and, at the same time, will not interfere with the function of the control device in any manner. Another advantage of the protective frame of this invention is the clamping of the control levers with a friction pad which thwarts manipulation of the control levers while the protective frame is in closed position.

The embodiment of this invention described above in connection with Figs. 1, 2 and 3, may be subjected to various modifications. One such modification is shown in Fig. 4. In Fig. 4 a frame 42 is shown made up of a single piece of metal strip formed to have two long sides 43, a short upper end 44, and a lower end divided into two short sections 45 and 46. The frame 42 has sufficient inherent spring so that it may be opened at the bottom between the sections 45 and 46. The upper end 44 is provided with a flanged piece 47 having an inferior flange 48 similar to the flange 32 shown and described in connection with Figs. 1 and 2. In this modification a lock 49 is provided on the short section 45 and an aperture 50 is provided on the short section 46. The lock 49 is adapted to enter the aperture 50 when the short sections 45 and 46 are drawn together. Friction pads 51 are provided on the interior surface of the frame 42 at any appropriate place where they will come in contact with the manual controls of the thermostatic control device (not shown) to which the frame 42 is to be applied.

The frame 42 is applied and used in a manner similar to the frame 23 described above. The frame 42, however, as mentioned, is sprung open and fitted over the appropriate control device with the flange 48 inserted between the control device and the supporting wall surface. The control device is then secured to the wall and the protective frame 42 locked in position around it with the friction pads 51 coming in contact with and locking the manual controls.

In the embodiments described above the protective flanges cooperate with the surface of the mount to cover the controls. This may be modified so that the protective flanges engage or cooperate with some other surface of the control device. Various other modifications of the structure embodying this invention may be made without departure from the spirit of the invention. For this reason, this invention is defined by the scope of the appended claims.

I claim:

1. The combination of a thermostatic control device supportable on a surface and having a casing projected away from said supporting surface and from which a manually operated control protrudes, with a flanged frame mounted thereon, including members of said frame having flexibility to provide a separation of the members in an open position and a juncture of the members in a closed position, primary flanges on said frame positionable over said control and cooperating with said projected casing at a point adjacent said control and relatively close to said supporting surface, said flanges forming a periphery around a central area enclosed by said frame, a main portion of said thermostatic control device casing extending outside of and unenclosed by said frame, thermostatic control device indicia mounted on said extended portion of said casing, a secondary flange attached to said frame positionable between said thermostatic control device and said supporting surface and unattached thereto and extending across less than a substantial portion of said enclosed area, and means for locking said flexible frame members in the closed position when said flanges are so positioned whereby said control is rendered inaccessible.

2. A thermostatic control device composed of a thermosensitive mechanism, adjusting controls for said thermosensitive mechanism, a casing enclosing said thermosensitive mechanism, ends of said controls protruding from said casing, a base supporting said thermosensitive mechanism and said casing supportable on a surface, a surface of said base protruding beyond said casing, a rectangular frame positioned around said casing and enveloping said base, a main portion of said casing extending perpendicularly away from said protruding base and outside of said rectangular frame, thermostatic control device indicia mounted on said extended portion of said casing, a plurality of flanges unitary with said frame positioned in engageable relationship with said protruding base surface and enclosing ends of said control, and a second flange unitary with said frame unattached to said supporting surface or said base and positionable between said supporting surface and said base whereby attachment of said base to said supporting surface retains said second flange between said base and said supporting surface and secures said frame and said first flanges with relation to said base, said casing and said ends of said controls.

TED STILER.

References Cited in the file of this patent

UNITED STATES PATENTS

| Number | Name | Date |
|---|---|---|
| 1,829,824 | Forrester | Nov. 3, 1931 |
| 1,955,462 | Kaufman | Apr. 17, 1934 |
| 2,085,975 | Hauf | July 6, 1937 |
| 2,236,302 | Scott | Mar. 25, 1941 |
| 2,302,560 | Latona | Nov. 17, 1942 |